United States Patent Office 3,272,789
Patented Sept. 13, 1966

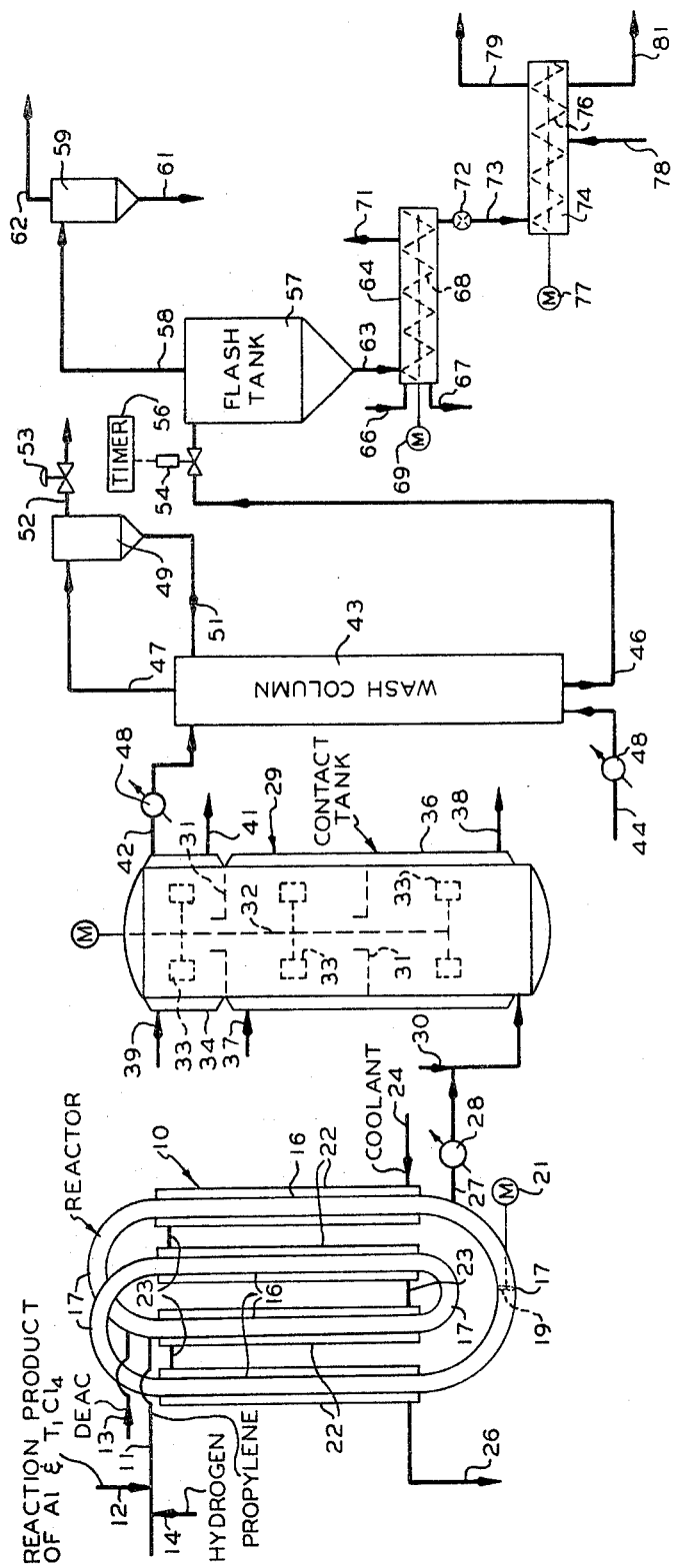

3,272,789
TREATMENT OF OLEFIN POLYMERS TO REMOVE CATALYST RESIDUES
Richard S. Joyner and Louis E. Perrier, Bartlesville, Okla., assignors to Phillips Petroleum Company, a corporation of Delaware
Filed Jan. 24, 1963, Ser. No. 253,632
15 Claims. (Cl. 260—93.7)

This invention relates to the production of olefin polymers having a low ash content and a desirable color and heat stability. In one aspect, it relates to a process for treating polymers prepared in a mass polymerization so as to substantially reduce the ash content of the polymers.

Various reactions for polymerizing olefins are described in the literature, and the polymerizations are usually carried out in the presence of catalysts. One type of catalyst which has been widely used in the polymerization of monolefins, particularly ethylene, consists of an organometal compound, e.g., triethylaluminum, and a compound of a heavy metal, e.g., titanium tetrachloride. When certain olefins, such as propylene, are contacted with such a catalyst, there is obtained a polymer containing greater or lesser amounts of a fraction which is crystalline and which is characterized by a certain regularity of molecular structure. Thus, a polypropylene molecule can be considered as a chain of 2-carbon units with a methyl side group attached to every other carbon in the chain. Certain polymers of this type are characterized by the fact that they contain series of such monomer units in which all the methyl side groups are oriented in space at the same position or at the same angle with respect to the tertiary carbon atoms to which they are attached. The portion of the polymer having this regular structure is highly crystalline and is generally referred to as isotactic polypropylene. The portion of the polymer that does not have this regular structure is amorphous and is usually described as atactic polypropylene. It is recognized that the highly crystalline polypropylene is preferred for most practical applications.

A well-known procedure for preparing isotactic polymers of mono-1-olefins, such as propylene, involves the polymerization of propylene with a catalyst system comprising an alkylaluminum compound and titanium trichloride. One of the problems encountered with polymers prepared by such processes concerns the presence in the products of catalyst residues or ash-forming ingredients. The "ash content" of a product refers to the inorganic constituents which are present in the polymer in unidentified form and which produce ash when the polymer is burned. The presence of these catalyst residues in the polymer adversely affect the color and heat stability of the polymer, as well as its electrical properties. In one process proposed for the polymerization of mono-1-olefins, the olefin is polymerized in a mass system wherein the propylene is in liquid phase and the polymerization is conducted without the addition of more than small amounts of an inert diluent. In such processes, the only inert diluent present in the polymerization zone is that which may be present in the feed or that which may be used in the introduction of the catalyst. Because no extraneous diluent is present when using the mass polymerization technique, the polymer often contains a larger quantity of catalyst residues than when the same system is used in the presence of a diluent. The conventional method employed to remove catalyst residues from polymers prepared by these processes is to initially separate the polymer from the diluent or, in the mass polymerization process, from the monomer. Thereafter, the separated polymer is treated with a washing agent which is usually an alcohol, such as isopropyl alcohol. While this treatment of the polymer is quite effective in reducing the ash content of the polymer, the method has certain disadvantages, particularly in a continuous polymerization process. When using a material such as an alcohol, an entirely different type of material is thereby introduced into the system. As a result, it becomes necessary to provide special equipment for the recovery and purification of the alcohol. From an economical standpoint, the use of a material such as alcohol to treat the polymer is unsatisfactory. Furthermore, the presence of the alcohol in the system presents difficulties in handling because of leakages and evaporation.

An improved method has recently been proposed for treating the polymerization reactor effluent containing solid polymer, soluble polymer, catalyst residues and liquid olefin. In accordance with this method, the reactor effluent is mixed with a diketone under conditions such that the olefin remains in the liquid phase. An important step in this catalyst removal operation involves washing the treated reactor effluent with a low boiling hydrocarbon. This step is accomplished by introducing the effluent into an upper portion of a wash column and by charging the wash liquid to a lower portion of the column. As a result of this method of charging the two streams, the effluent is washed in a countercurrent contacting procedure with the low boiling hydrocarbon, and a slurry of polymer product in the hydrocarbon is withdrawn from the bottom of the column. The prime consideration in the operation of the wash column is to obtain a product having a low ash content. However, there are also additional factors that must be considered in the operation of the wash column. The effluent from the polymerization reactor contains a large amount of polymer product which is in the form of fine particles. Since these fines represent a large percentage of the polymer product, it is imperative that the concentration of fines in the overhead from the wash column be maintained at a minimum. The reactor effluent also includes soluble atactic polymer. In order to obtain a desirable product having a high isotactic content, it is necessary to minimize the amount of the soluble polymer that is withdrawn from the bottom of the wash column.

It is an object of the present invention, therefore, to provide an improved process for treating the effluent recovered from an olefin polymerization process.

Another object of the invention is to provide an improved process for producing polymers of mono-1-olefins having a low ash content.

Still another object of the invention is to provide a process for treating a stream containing solid polymer, liquid monomer and polymer soluble in the monomer so as to recover in increased yields a solid polymer having a reduced ash content.

Various other objects, advantages and features of the invention will become apparent to those skilled in the art upon consideration of the accompanying disclosure and the drawing which is a schematic flow diagram illustrating a preferred embodiment of the invention.

The present invention is concerned with an improvement in a process for polymerizing a mono-1-olefin with a catalyst formed by mixing materials comprising an organometal compound and a metal salt. The polymerization is preferably conducted as a mass polymerization process in the substantial absence of a hydrocarbon diluent or solvent and under conditions such that the monomer serves as the diluent, and a solid polymer in particle form is obtained as the product. However, it is to be understood that the invention is also applicable to a polymerization process in which a hydrocarbon, such as paraffinic hydrocarbon, preferably having from 3 to 6 carbon atoms per molecule, is used as a diluent and a particle form polymer is obtained as the product. Examples of suitable hydrocarbon diluents include propane, n-butane, isobutane, n-pentane, and the like. Broadly speaking, in a polymerization process wherein a mono-1-olefin is contacted with a catalyst capable of polymerizing the olefin under polymerization conditions so as to form a solid polymer and wherein an effluent containing solid polymer, soluble polymer, catalyst, residues and liquid hydrocarbon is recovered from the polymerization and the effluent is mixed with a diketone under conditions such that the hydrocarbon remains in the liquid phase, the improvement resides in the steps which comprise (1) recovering the thus treated effluent and introducing same into an upper portion of an elongated washing zone, (2) introducing a wash liquid comprising a low boiling hydrocarbon, preferably the same hydrocarbon used in the polymerization, into a lower portion of the washing zone, (3) maintaining the washing zone under conditons such that the low boiling hydrocarbon remains in the liquid phase and a temperature differential exists between the upper portion and the lower portion of the zone, the temperature of the upper portion of the zone being higher than the temperature of the lower portion of the zone, and (4) recovering from the lower portion of the washing zone a slurry of solid polymer in the low boiling hydrocarbon. In a prefered embodiment, the polymerization is carried out as a mass polymerization in which the mono-1-olefin is in liquid phase and serves as the hydrocarbon diluent, the effluent recovered from the polymerization contains solid polymer, soluble polymer, catalyst residues and liquid mono-1-olefin, and the wash liquid is the same as the olefin used in the polymerization. When operating in the foregoing manner, it has been found that the polymer product has an ash content of 0.01 weight percent or less. Such a polymer meets the requirements as to color and heat stability and possesses satisfactory electrical properties. Furthermore, the quantity of fines taken overhead and the amount of soluble polymer withdrawn from the bottom of the column are reduced to a minimum. In order to obtain these desirable results, it is imperative that a minimum temperature differential of at least 1° F. be maintained between the top and bottom of the column. If this relationship is not maintained, thermal currents circulate and mix the contents of the column, thereby rendering ineffective the separation and washing functions of the wash column.

As mentioned hereinbefore, the polymers which are treated in accordance with the present process are prepared from mono-1-olefins. The present invention is particularly applicable to the treatment of isotactic polymers which are prepared by polymerizing mono-1-olefins containing at least 3 carbon atoms and preferably not more than 5 carbon atoms. Examples of such monomers include propylene, 1-butene, 1-pentene, 3-methyl-1-butene, and the like. Furthermore, it is to be understood that polyethylene can be treated by the present process in order to remove catalyst residues. It is to be understood also that mixtures of two or more monomers can be employed in the polymerization of produce copolymers which are then treated by the present process. In a preferred embodiment of the invention, propylene is utilized as the monomeric material.

Since a wide variety of catalyst systems can be employed in the polymerization, it is not intended to limit the invention to any particular catalyst system. Catalyst systems suitable for use in the polymerization are those which are capable of polymerizing a mono-1-olefin in a mass polymerization and under conditions such that solid polymer in particle form is produced. Catalyst systems suitable for use can be broadly defined as comprising an organometal compound and a metal salt. A particularly suitable catalyst is one which comprises (a) a compound having the formula $R_nMX_m$, wherein R is an alkyl, cycloalkyl or aryl radical or combinations of these radicals, such as alkaryl, aralkyl and alkylcycloalkyl, X is hydrogen or a halogen, including chlorine, bromine, iodine and fluorine, M is aluminum, gallium, indium or thallium, $n$ is from 1 to 3, inclusive, $m$ is from zero to 2, inclusive, and the sum of $m$ and $n$ is equal to the valence of the metal M, and (b) a halide of a metal of Group IV-B, V-B, VI-B or VIII. The hydrocarbon radicals which can be substituted for R in the aforementioned formula include radicals having up to about 20 carbon atoms each. Radicals having 10 carbon atoms or less are preferred since the resulting catalyst composition has a greater activity for initiating the polymerization.

Examples of compounds corresponding to the formula $R_nMX_m$ which can be employed include trimethylaluminum, triethylaluminum, triisobutylaluminum, tri-n-butylaluminum, tri-n-pentylaluminum, triisooctylaluminum, tri-n-dodecylaluminum, triphenylaluminum, triethylgallium, triphenylgallium, tricyclohexylgallium, tri-n-butylindium, triethylthallium, diethylaluminum hydride, $CH_3AlCl_2$, $(CH_3)_2AlCl$, $C_2H_5AlCl_2$, $(C_2H_5)_2AlCl$, $(C_4H_9)_2AlBr$, $C_8H_{17}AlI_2$, $(C_3H_7)_2GaF$, $(C_6H_{11})_2GaCl$ (cyclohexane derivative), $(C_6H_5)GaBr_2$ (benzene derivative), $$C_{20}H_{41}GaBr_2$$

$(C_{14}H_{29})_2GaF$, $(C_6H_5)_2InCl$ (benzene derivative), $$C_8H_{17}InF_2$$

$(C_6H_{11})InBr_2$ (cyclohexane derivative), 3-methylcyclohexylaluminum dichloride, 2-cyclohexylethylgallium dichloride, p-tolylberylium iodide, di-(3-phenyl-1-methylpropyl)indium fluoride, 2-(3-isopropylcyclohexyl)ethylthallium dibromide, and the like.

The metal halide component of the catalyst system is preferably a halide of a Group IV-A metal, i.e., titanium, zirconium, hafnium and germanium. However, it is to be understood that halides of metals of the other groups specified above, such as vanadium, molybdenum, tungsten cobalt, and iron can also be employed in the catalyst system. The trichlorides, trifluorides, tribromides, and triiodides, as well as the tetrachlorides, tetrafluorides, tetrabromides and tetraiodides of the various metals, can be used in the catalyst system, either individually or as mixtures of two or more of the metal halides. It is usually preferred to employ a trichloride, such as titanium trichloride, in the polymerization.

A preferred catalyst system employed in the polymerization is formed by mixing a dialkylaluminum chloride and titanium trichloride. A particularly preferred catalyst is one that is formed by mixing a dialkylaluminum chloride with a reaction product containing titanium, aluminum and chlorine. The reaction product is prepared by reacting aluminum and titanium tetrachloride and corresponds to the approximate formula $Al_1Ti_3Cl_{12}$. The reaction of the aluminum and titanium tetrachloride is usually conducted at an elevated temperature, for example, at a temperature in the range of 360 to 600° F., preferably from 375 to 450° F. It is to be understood that the foregoing catalyst systems are not equivalent since the results obtained with the catalyst prepared with the reaction product are greatly superior to the results obtained with the titanium trichloride.

The amount of catalyst employed in the polymerization can vary over a rather wide range and will depend at least to a certain degree upon the particular catalyst system utilized. However, the determination of the actual amount of the catalyst employed in any particular polymerization is well within the skill of the art. In general, the mol ratio of the organometal compound to the metal salt falls within the range of 0.02 to 50 mols. When employing the preferred catalyst system, the mol ratio of the dialkylaluminum halide to the aluminum-titanium tetrachloride reaction product usually ranges from 1.0:0.005 to 1.0:50.0, preferably 1.0:0.1 to 1.0:10.0. The amount of the dialkylaluminum halide used should be at least $1. \times 10^{-4}$ gm./gm. of monomer and can be as much as $25 \times 10^{-4}$ gm./gm. of monomer. The amount of the aluminum-titanium tetrachloride reaction product employed is generally in the range of $1.5 \times 10^{-4}$ to $10 \times 10^{-4}$ gm./gm. of monomer.

Although not essential to the conduct of the polymerization, it is often desirable to carry out the polymerization in the presence of elemental hydrogen. When so operating, hydrogen is added in an amount sufficient to provide from 0.15 to 0.40 mol percent hydrogen in the liquid mono-1-olefin phase in the polymerization zone. By operating in this manner, the productivity of the catalyst is increased and certain properties of the polymer, e.g., flexural modulus, are improved.

The diketones suitable for use in the practice of the present invention include alpha-diketones and beta-diketones. These diketones can also be defined as being selected from the group consisting of compounds having the formulas:

(1) 

and (2) 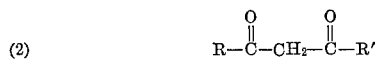

wherein R and R' are hydrocarbon radicals, such as alkyl, cycloalkyl and aryl. Examples of suitable alpha-diketones include the following: 2,3-butanedione, 2,3-pentanedione, 3,4-hexanedione, 4-methyl-2,3-pentanedione, 3,4-heptanedione, 5-methyl - 2,3 - hexanedione, 2,5 - dimethyl - 3,4-hexanedione 2,2,5,5 - tetramethyl - 3,4 - hexanedione, 1,2-cyclopentanedione 3-methyl-1,2-cyclopentanedione, 1,2-cyclohexanedione, bibenzoyl, bi-2-furoyl, methylphenylglyoxal, phenylbenzylglyoxal, 4,4'-dimethoxybenzil, and the like. The following are examples of suitable beta-diketones: 2,4-pentanedione (acetylacetone), 2,4-hexanedione, 2,4-heptanedione, 5-methyl-2,4-hexanedione, 2,4-octanedione 5,5-dimethyl-2,4-hexanedione, 3 - ethyl - 2,4-pentanedione, 3,3-diethyl-2,4-pentanedione, 2,2-dimethyl-3,5-nonanedione, 1-cyclohexayl-1,3-butanedione, 5,5-dimethyl-1,3-cyclohexanedione, 1-phenyl-1,3 - butanedione, 1-(4-biphenylyl-1,3-butanedione, 1-phenyl-1,3 - pentanedione, 1-phenyl-5,5-dimethyl-2,4-hexanedione, 1,3-diphenyl-1,3-propanedione, 1,4-diphenyl-1,3-butanedione 1-phenyl 2-benzyl-1,3-butanedione, 1-phenyl-3-(2-methoxyphenyl)-1,3-propanedione, 1-(4-nitrophenyl)-1,3-butanedione, 1-(2-furyl)-1,3-butanedione, 1-(tetrahydro-2 - (furyl) - 1,3-butanedione, and the like.

A more comprehensive understanding of the invention can be obtained by referring to the drawing which is a flow diagram illustrating a preferred embodiment of the invention. While the drawing is described with regard to a process in which propylene is polymerized with a specific catalyst system, it is to be understood that it is not intended to limit the invention to this specific embodiment. As discussed hereinbefore, the invention is broadly applicable to the treatment of polymers of mono-1-olefins prepared by mass polymerization, utilizing a catalyst capable of polymerizing the monomer to a solid polymer under the conditions employed. As used herein, the term "mass polymerization" is used to designate a polymerization which is conducted with the monomer in liquid phase and without the addition of more than small amounts of an inert diluent. The expression "small amounts of an inert diluent" is intended to mean such amounts of inert diluent as may be introduced into the polymerization zone by way of inert material in the monomer feed and inert diluent employed for ease of handling the catalyst components.

Referring now to the drawing, propylene is charged to reactor 10 through line 11. Prior to use in the polymerization, the propylene is treated by conventional methods in order to remove contaminants such as oxygen, carbon dioxide and moisture. It is also the usual practice to purge the reactor with an inert gas, such as nitrogen, in order to remove such contaminants prior to commencement of the polymerization. Lines 12 and 13, respectively, provide means for charging the catalyst ingredients, for example, a reaction product of aluminum and titanium tetrachloride and diethylaluminum chloride, to the system. As shown, line 12 is connected to line 11 so that the reaction product enters the reactor along with the liquid propylene. As previously mentioned, it has been found to be advantageous to carry out the polymerization in the presence of hydrogen. Line 14 connected to the monomer feed line provides means for charging hydrogen to the reactor along with the liquid propylene.

The reactor illustrated in the drawing is a loop-type reactor which comprises two loops. Each loop is composed of two straight legs 16 which may conveniently be in the form of elongated pipe sections. The ends of the legs of the reactor are conveniently interconnected by means of L's 17 so as to provide a continuous flow path through the reactor. The reactor is provided with an impeller 19 which is operatively connected to a turbine 21. The operation of the impeller furnishes the motive force for flowing the materials through the loop reactor. The vertical legs of the loop reactor are encompassed by heat exchange jackets 22 which are interconnected by means of lines 23. Line 24 connected to the heat exchange jacket associated with one of the outer legs provides means for introducing a coolant such as water. The coolant flows through the heat exchange jackets at a temperature and at a rate such as to maintain a desired polymerization temperature in the reactor. The coolant is removed from the reactor system by means of line 26 which is connected to the other outer leg of the reactor. Although it is often preferred to employ a loop-type reactor, it is to be understood that the polymerization can be conducted in any suitable polymerization zone, such as in a closed reaction vessel provided with a stirring means.

In conducting the polymerization, the conditions utilized will vary to a certain degree depending upon the particular mono-1-olefin utilized. The polymerization temperature is usually in the range of 0 to 160° F. When polymerizing ethylene, a temperature in the range of 0 to 45° F. is generally employed. In the polymerization of propylene, the temperature in reactor 10 can vary in the range of 90 to 160° F. When polymerizing a higher olefin, such as 1-butene, a lower polymerization temperature is used, e.g., 86° F. or lower. In the polymerization of olefins containing 5 carbon atoms, still somewhat lower temperatures are utilized, e.g., about 75° F. or lower. In general, the polymerization is conducted at a temperature such that solid polymer in particle form is obtained in the polymerization. The actual amount of solid polymer formed is also dependent upon the particular catalyst system employed. When using the preferred catalyst system as described above, it has been found that a very high percentage of solid polymer is obtained with a minimum formation of soluble polymer. The pressure employed in reactor 10 is sufficient to maintain the reactants in the liquid phase. The maximum pressure used is only limited by practical considerations although it is generally undesirable to exceed a pressure of 2000 p.s.i.g. When polymerizing ethylene, the lower limit of pressure is about 425 p.s.i.g. at a polymerization temperature of about 0° F. In the polymerization of propylene, the lower limit of pressure is about 225 p.s.i.g. at a polymerization temperature of about 90° F. In the case of higher olefins, the lower limit of pressure will be somewhat lower. The residence time in reactor 10 can range from about 1 to about 5 hours, with a residence time of about 3 hours being preferred.

The effluent stream recovered from reactor 10 through line 27 comprises solid polymer, soluble polymer, liquid propylene and catalyst residues. The stream usually contains in the range of 25 to 40, preferably 35, weight percent solid polymer. After removal of the effluent through line 27, it is passed through indirect heat exchange means 28 prior to introduction into a lower portion of contact tank 29. Although it is within the contemplation of the invention to introduce the effluent directly into the contact tank without prior heating, it is often advantageous to heat the effluent prior to its entering the contact tank. Line 30 provides means for introducing a diketone, such as acetylacetone, into the contact tank. It is noted that line 30 is connected to line 27 so that the acetylacetone enters the contact tank along with the effluent. When a hydrocarbon diluent is employed, the effluent recovered from reactor 10 comprises solid polymer, soluble polymer hydrocarbon diluent containing dissolved monomer, and catalyst residues.

In contact tank 29 the acetylacetone is thoroughly mixed with the effluent from reactor 10. The contact tank depicted in the drawing comprises an enclosed tank having baffle members 31 disposed in the upper and lower portions of the tank. The baffle members are attached to the walls of the tank and are each provided with a central opening through which the shaft of stirring means 32 passes. The positioning of the baffle members in this manner in effect divides the contact tank into upper, intermediate and lower sections. Each of these sections is provided with a stirrer 33 which is attached to the shaft of stirring means 32. It has been found that particularly good contact is obtained between the acetylacetone and the effluent from reactor 10 when utilizing this specific structure.

The upper portion of the contact tank is provided with a cooling jacket 34 while the lower and intermediate portions of the tank are encompassed by a heating jacket 36. As disclosed by R. E. Dollinger et al. in copending U.S. patent application Serial No. 228,613, filed on October 5, 1962, improved results are obtained if the contact tank is divided into a heating zone and a cooling zone. The heated portion of the contact zone, including the lower and intermediate sections of the contact tank, is preferably maintained at a temperature in the range of 131° F. to 160° F. This is accomplished by introducing a heating fluid, such as steam or hot water, into jacket 36 through line 37. After circulating through the jacket, the heating fluid is withdrawn through line 38. The upper cooled portion of the contact tank is maintained at a temperature in the range of 110 to 130° F., preferably in the range of 115 to 120° F. Cooling of the upper portion of the contact tank is accomplished by circulating a coolant, such as water, through jacket 34 by means of lines 39 and 41. The pressure within the contact tank is sufficient to maintain the diluent in the liquid phase and is preferably in the range 400 to 500 p.s.i.g.

The diketone, e.g., acetylacetone, can be introduced into line 27 by itself, or it can be added as a solution in a hydrocarbon which is inert to the reactants. However, the acetylacetone is preferably charged as a solution, e.g., a 1 percent solution, in the monomer. The amount of treating agent added in this manner may range from 1 to 5 times the stoichiometric equivalent, based on the amount of catalyst present. It is also within the scope of the invention to use an alkylene oxide having from 2 to 8 carbon atoms per molecule in combination with the diketone. The use of an alkylene oxide, such as propylene oxide, in conjunction with a diketone is described in detail by R. E. Dietz in copending U.S. patent application, Serial No. 190,263, filed on April 26, 1962. The contact time in contact tank 29 can vary within rather wide limits, e.g., from 5 minutes to 1 hour, however, it is usually preferred to use a contact time in the range of 20 to 30 minutes.

The treated effluent is withdrawn from an upper portion of contact tank 29 through line 42 and then passed into the upper portion of wash tank 43. As shown in the drawing, the wash tank comprises an elongated column. Line 44 provides means for introducing wash liquid into the lower portion of the wash column. Although various light hydrocarbons, particularly paraffinic hydrocarbons containing from 4 to 6 carbon atoms per molecule, such as normal pentane, can be employed as the wash liquid, it is usually preferred to use the monomer, e.g., propylene, for this purpose. Furthermore, because of the improved results obtained with propylene, it is not to be implied that the use of propylene is equivalent to the use of a material such as pentane as the wash liquid. It is also within the scope of the invention to employ a mixture of the monomer and a light hydrocarbon as the wash liquid.

The effluent entering the wash column through line 42 flows downwardly therethrough and contacts the liquid propylene charged to the column through line 44 in countercurrent flow. As discussed hereinbefore, a high percentage of the solid polymer product is in the form of very fine particles which it is desired to recover from the bottom of the wash column. Furthermore, the treated effluent contains soluble polymer as well as catalyst residues, and it is not desired to recover these materials with the polymer product. In order to effect the desired separation of these materials in the wash column, it has been found to be critical that the temperature of the top of the column be at least 1° F. higher than the temperature of the bottom of the column. The temperature of the bottom of the column is generally in the range of 50 to 89° F., preferably in the range of 50 to 65° F. The temperature of the top of the column is usually in the range of 90 to 130° F., preferably in the range of 100 to 120° F. When operating the wash column at temperatures in these ranges and with a temperature differential between the top and bottom of the column of at least 1° F., it has been found that the polymer product withdrawn from the bottom of the column as a slurry in liquid propylene through line 46 generally contains less than 0.01 weight percent catalyst residues. Furthermore, the amount of soluble polymer contained in this product stream and the amount of polymer fines lost to the overhead stream withdrawn through line 47 are maintained at a minimum. Operation in the described manner prevents the occurrence of thermal currents which would have a tendency to circulate and mix the contents of the column and thereby prevent the desired separation and washing action. The desired temperature in the top and bottom of the column is regulated by controlling the temperature of the treated effluent and the wash liquid which are charged, respectively, through lines 42 and 44. Lines 42 and 44 can be provided with heat exchange means 48 in order to facilitate controlling the temperatures of these two streams. The ratio of the amount of wash liquid to polymer, on a weight basis, is generally in the range of 3:1 to 25:1. Actually, the upper limit is not critical, being limited only by the capacity of the wash column.

The overhead stream recovered from the wash column through line 47 contains propylene, soluble polymer, catalyst residues, and a negligible amount of solid polymer. The overhead stream is passed into cyclone separator 49, the underflow from which contains the solid polymer. The solid polymer separated in cyclone separator 49 is returned to the wash column by means of line 51. The overflow from cyclone separator 49, which is withdrawn through line 52, contains propylene, soluble polymer and catalyst residues. This stream can be further treated in order to recover the propylene for use in the process. The overhead stream is withdrawn from the wash column at a rate such as to maintain a predetermined pressure in reactor 10. This is accomplished by means of motor valve 53 which is positioned in line 52. Valve 53 is operatively connected to a pressure recorder controller (not shown) which is preset at the pressure to be maintained in reactor 10. This combination of apparatus functions in a manner such that the overhead stream is withdrawn from the wash tank at a rate corresponding to the pressure at which the controller is preset.

As mentioned above, a slurry of solid polymer in propylene is recovered from the bottom of the wash column through line 46. The slurry generally contains up to about 50 weight percent solids, e.g., 40 to 50 weight percent. The slurry of polymer in propylene is withdrawn from the wash column through a suitable flow control means, such as cyclically operated motor valve 54. This valve is operatively connected to timer 56 which controls the frequency of the valve cycle. The slurry can be withdrawn from the wash column at any desired rate merely by adjusting the setting of the timer. It is preferred to utilize a cyclically operated motor valve which opens, e.g., every 10 to 30 seconds for a short period of time, e.g., of about 1 second. It is also within the scope of the invention to control the operation of the timer by means of a solids level controller which is operatively connected to the lower portion of the wash column and to the timer. When employing this arrangement of apparatus, the timer operates motor valve 54 so that a desired level of polymer solids is maintained in the bottom portion of the wash tank.

Upon passing through valve 54, which functions as a pressure let-down valve, the polymer slurry flashes as it passes into flash tank 57. In the flash tank the pressure may range from 16 to 65 p.s.i.g. while the temperature may be in the range of −50 to 15° F. The propylene which flashes off is withdrawn from the flash tank through line 58 and then passed into cyclone separator 59. In the cyclone separator, any solid material contained in the gaseous propylene stream is recovered as underflow through line 61 and is usually discarded. The gaseous propylene is recovered as the overflow through line 62. After being subjected to suitable purification operations, the gaseous propylene is then reused in the process.

Solid polymer in particle form and containing residual amounts of propylene is withdrawn from the bottom of flash tank 57 through conduit 63 and falls into dryer-conveyor 64. This conveyor is equipped with a jacket through which hot water or other suitable heat exchange fluid can be circulated. The heat exchange fluid is introduced into the jacket through line 66 and is withdrawn therefrom through line 67. Conveyor 64 is provided with an auger 68 which is powered by a motor 69. As the polymer solids are moved through the conveyor by means of the auger, propylene is evaporated as a result of the heat imparted to the moving polymer by the hot water circulating through the jacket. The propylene vapors are removed from conveyor 64 through line 71. This gaseous propylene can thereafter be suitably treated and reused in the process. After the polymer solids are conveyed to the end of conveyor 64, they are passed through rotary valve 72 positioned in conduit 73. The polymer solids then drop into purge conveyor 74 which includes an auger 76 driven by a motor 77. As the polymer solids are moved through conveyor 74, they are contacted with a heated non-combustible gas introduced through line 78. Any suitable non-combustible gas, such as carbon dioxide, nitrogen, or the like, can be utilized. In flowing through conveyor 74, the gas contacts the polymer solids as they are moved therethrough, thereby evaporating residual amounts of propylene and also purging previously evaporated propylene. The gases are withdrawn from conveyor 74 through line 79 after which they can be passed to a flare. Polymer solids, substantially free of propylene and having an ash content of less than about 0.01 weight percent, are recovered from purge conveyor 74 through line 81. The polymer so recovered can then be transferred to suitable storage facilities or to subsequent operations such as packaging or pelleting.

The polymer products prepared in accordance with this invention have utility in applications where solid plastics are employed. The polymer can be molded to form articles of any desired shape such as bottles and other containers for liquids. Furthermore, the product can be utilized in the manufacture of film and it can be formed into fibers and pipe by extrusion.

A more comprehensive understanding of the invention can be obtained by referring to the following illustrative examples which are not intended, however, to be unduly limitative of the invention.

EXAMPLE I

A series of runs was conducted in which propylene was polymerized in a mass polymerization in the presence of hydrogen and utilizing a catalyst formed by mixing diethylaluminum chloride and a reaction product prepared by reacting aluminum and titanium tetrachloride. The reactor effluents recovered from the polymerizations were treated with acetylacetone after which the treated effluents were washed with propylene in a wash column which was operated in accordance with the present invention. The arrangement of apparatus employed in the runs was similar to that shown in the drawing. The conditions under which the runs were conducted and the results obtained are shown below in the table.

*Table I*

| Reactor Temp., °F. | Productivity [1] | Al-TiCl₄ Reaction Product Addition, lb./hr. | DEAC Addition, lb./hr. | Acetylacetone Added,[3] Stoichiometric Amounts | Wash Column Temperature, °F. | | Polymer Product | | |
|---|---|---|---|---|---|---|---|---|---|
| | | | | | Top | Bottom | Ash [4] p.p.m. | Pentane [5] Solubles, Weight, percent | Xylene [6] Solubles, Weight, percent |
| 120 | 920 | .0266 | .0327 | 2.6 | 111 | 71 | 35 | 0.91 | |
| 120 | 890 | .0271 | .0322 | 3.6 | 115 | 70 | 35 | 1.8 | |
| 120 | 745 | .0190 | .0230 | 1.5 | 120 | 50 | 83 | 1.5 | |
| 140 | 1,300 | .0248 | .0295 | 2.8 | 115 | 55 | 55 | | 4.9 |

[1] Pounds of polymer per pound of Al-TiCl₄ reaction product.
[2] Diethylaluminum chloride.
[3] Based on total titanium and aluminum in the catalyst.
[4] Parts per million parts of polymer.
[5] The percent pentane solubles of the product polymer was determined by placing a weighed sample of dry polymer in a cylindrical graduate and adding 150 milliliters of pentane. The graduate was closed with a stopper and shaken about once each hour for three or four hours, after which it was allowed to stand overnight. From the graduate, 20 milliliters of liquid were removed to a weighed beaker and the pentane evaporated. The weight of residue was determined from this value and the percent pentane based on the original weight of the sample was calculated.
[6] In determining percent xylene solubles, one gram of polymer is placed in a 100 milliliter ASTM centrifuge tube containing 100 milliliters of xylene. The centrifuge tube is placed in a heater operating at 140° C. The contents of the tube are stirred occasionally with a stirring rod. After the polymer is completely dissolved, the centrifuge tube is removed from the heater and allowed to cool at room temperature for 15 minutes and is then placed in an ice bath for 30 minutes. The tube is then placed in a centrifuge and run at 1,900 r.p.m. for 15 minutes. 25 milliliters of the xylene solution was pipetted into a weighed aluminum weighing dish and put in a heater for 30 minutes. After the dish cools, it is weighed. The weight of polymer in the aluminum dish times 100 divided by the weight of the polymer sample is equal to the percent xylene solubles.

The data in the foregoing table show that the amount of ash present in the polymer products was less than 100 parts of ash per million parts of polymer. As mentioned hereinbefore, a polymer having an ash content of 0.01 weight per cent or less is an acceptable polymer that meets the requirements as to color and heat stability and possesses satisfactory electrical properties. The data in the table also show that the amount of soluble polymer present in the recovered product was very low. In this regard, it is noted that 2 weight percent pentane-soluble polymer or 5 weight percent xylene-soluble polymer can be tolerated and still have an acceptable polymer.

A series of control runs is conducted in a manner similar to the runs described above except as regards the operation of the wash column. In these runs, the wash column is operated so that the temperatures at the top and bottom of the column are equal or the top temperature is less than the bottom temperature. The products from these runs contain more than 0.01 weight percent ash and the amounts of pentane-soluble and xylene-soluble polymers are greater than 2 weight percent and 5 weight percent, respectively. Furthermore, the amount of product recovered in these runs is considerably less than in runs conducted according to the present invention, indicating that a portion of the product is being taken off overhead from the wash column in the form of fines.

EXAMPLE II

Runs were carried out in which a slurry of polypropylene in normal pentane was charged to the upper portion of a 4-inch diameter wash column. Normal pentane, which was used as the wash liquid, was introduced into the lower portion of the column. A glass column was utilized and the polypropylene feed slurry was colored blue with a hydrocarbon soluble dye in order that the washing action occurring in the column could be observed.

Initially, the normal pentane wash liquid was at a temperature of about 80° F. and the temperature of the polypropylene feed slurry was approximately 45° F. When the slurry was introduced into the column, the higher density of the pentane in the slurry immediately created currents in the column. The blue color in the slurry rapidly mixed throughout the column, and dye injected into the wash pentane rapidly mixed throughout the column. By using the dye, currents were easily visible and it was apparent that thermal currents were mixing the entire column.

When the slurry temperature was increased to 90° F. and the wash pentane was cooled to 50° F., the density of the pentane in the slurry became less than that of the pentane wash. The higher temperature at the top of the column reduced the liquid-phase density so that particles settled faster and fewer were lost overhead. Thermal currents were not observed in the column. The blue pentane from the slurry remained in the top section of the column and was washed overhead. A definite interface between the wash-slurry mixture and the fresh wash moving up the column was visible. By varying the slurry temperature and the wash pentane temperatures in several runs, it was determined that stable operation of the column was obtained if the temperature at the top of the column was 1° F. greater than at the bottom. Under these conditions, there were no thermal currents with subsequent mixing throughout the column.

As will be evident to those skilled in the art, many variations and modifications of the invention can be practiced in view of the foregoing disclosure. Such variations and modifications are clearly believed to come within the spirit and scope of the invention.

We claim:

1. In a polymerization process wherein a mono-1-olefin is contacted with a catalyst capable of polymerizing said olefin under polymerization conditions so as to form a solid polymer and wherein an effluent containing solid polymer, soluble polymer, catalyst residues and liquid hydrocarbon is recovered from said polymerization and said effluent is mixed with a diketone under conditions such that said hydrocarbon remains in the liquid phase, the improvement which comprises recovering the thus treated effluent and introducing same into an upper portion of an elongated washing zone; introducing a wash liquid comprising a low boiling hydrocarbon into a lower portion of said washing zone; maintaining said washing zone under conditions such that said wash liquid remains in the liquid phase and a temperature differential exists between said upper portion and said lower portion of said zone, the temperature of said upper portion of said zone being higher than the temperature of said lower portion of said zone; and recovering from said lower portion of said zone a slurry of solid polymer in said low boiling hydrocarbon.

2. A process according to claim 1 in which said mono-1-olefin is ethylene, said liquid hydrocarbon is n-pentane and said wash liquid consists essentially of n-pentane.

3. In a mass polymerization process wherein a liquid mono-1-olefin is contacted with a catalyst capable of polymerizing said olefin under polymerization conditions so as to form a solid polymer and wherein an effluent containing solid polymer, soluble polymer, catalyst residues and liquid olefin is recovered from said polymerization and said effluent is mixed with a diketone under conditions such that said olefin remains in the liquid phase, the improvement which comprises recovering the thus treated effluent and introducing same into an upper portion of an elongated washing zone; introducing a wash liquid comprising a low boiling hydrocarbon into a lower portion of said washing zone; maintaining said washing zone under conditions such that said wash liquid remains in the liquid phase and a temperature differential exists between said upper portion and said lower portion of said zone, the temperature of said upper portion of said zone being higher than the temperature of said lower portion of said zone; and recovering from said lower portion of said zone a slurry of solid polymer in said low boiling hydrocarbon.

4. A process according to claim 3 in which said diketone is selected from the group consisting of compounds having the following formulas:

(1) 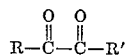

and (2) 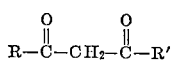

wherein R and R' are hydrocarbon radicals.

5. A process according to claim 3 in which said diketone is acetylacetone.

6. A process according to claim 3 in which said mono-1-olefin is propylene and said wash liquid consists essentially of propylene.

7. A process according to claim 3 in which said mono-1-olefin is propylene and said wash liquid consists essentially of n-pentane.

8. A process according to claim 3 in which said mono-1-olefin is propylene and said wash liquid consists essentially of a mixture of propylene and n-pentane.

9. A process according to claim 3 in which said mono-1-olefin is 1-butene and said wash liquid consists essentially of 1-butene.

10. A process according to claim 3 in which said mono-1-olefin is 3-methyl-1-butene and said wash liquid consists essentially of 3-methyl-1-butene.

11. In a mass polymerization process wherein a liquid mono-1-olefin is contacted with a catalyst formed by mixing materials comprising an organometal compound and a metal salt under polymerization conditions so as to form solid polymer and wherein an effluent containing solid polymer, soluble polymer, catalyst residues and liquid olefin is recovered from said polymerization and said effluent is mixed with a diketone under conditions such that said olefin remains in the liquid phase, the improvement which comprises recovering the thus treated effluent and introducing same into an upper portion of an elongated washing zone; introducing a wash liquid comprising a low boiling hydrocarbon into a lower portion of said washing zone; maintaining said washing zone under conditions such that said wash liquid remains in the liquid phase, the temperature of said upper portion of said washing zone being in the range of 90 to 130° F. and the temperature of said lower portion of said washing zone being in the range of 50 to 89° F., and recovering from said lower portion of said washing zone a slurry of solid polymer in said wash liquid.

12. The process according to claim 11 in which the temperature of said upper portion of said washing zone is at least 1° F. higher than the temperature of said lower portion of said washing zone.

13. The process according to claim 11 in which the temperature of said upper portion of said washing zone is in the range of 100 to 120° F. and the temperature of said lower portion of said washing zone is in the range of 50 to 65° F.

14. The process according to claim 11 in which said mono-1-olefin is propylene, said catalyst is formed by mixing a dialkylaluminum chloride with a reaction product obtained by reacting aluminum and titanium tetrachloride and said wash liquid consists essentially of propylene.

15. The process according to claim 11 in which said mono-1-olefin is propylene, said catalyst is formed by mixing a dialkylaluminum chloride with titanium trichloride and said wash liquid consists essentially of propylene.

References Cited by the Examiner

UNITED STATES PATENTS

| | | | |
|---|---|---|---|
| 2,846,427 | 8/1958 | Findlay | 260—94.9 |
| 3,066,124 | 11/1962 | Telfer | 260—94.9 |
| 3,197,454 | 7/1965 | Plaster | 260—94.9 |

FOREIGN PATENTS 571,762    3/1959   Canada.

JOSEPH L. SCHOFER, *Primary Examiner.*

E. M. OLSTEIN, L. EDELMAN, *Assistant Examiners.*